United States Patent [19]

Gemma et al.

[11] Patent Number: 4,638,428
[45] Date of Patent: Jan. 20, 1987

[54] POLLING CONTROL METHOD AND SYSTEM

[75] Inventors: Hideaki Gemma; Masafumi Hino, both of Hadano, Japan

[73] Assignee: Hitachi, Ltd., Tokyo, Japan

[21] Appl. No.: 681,028

[22] Filed: Dec. 13, 1984

[30] Foreign Application Priority Data

Dec. 14, 1983 [JP] Japan ................................ 58-235298

[51] Int. Cl.[4] ............................................. G06F 13/22
[52] U.S. Cl. .................................................... 364/200
[58] Field of Search ... 364/200 MS File, 900 MS File

[56] References Cited

U.S. PATENT DOCUMENTS 4,038,641 7/1977 Bouknecht et al. ................. 364/200
4,053,950 10/1977 Bourke et al. ...................... 364/200
4,177,512 12/1979 Moggia ............................... 364/200

Primary Examiner—Raulfe B. Zache
Attorney, Agent, or Firm—Antonelli, Terry & Wands

[57] ABSTRACT

In a terminal control unit having a polling function to a plurality of terminal devices, the number of times of continuous non-response to the polling is counted for each terminal device address. If the number of times exceeds a predetermined number, a frequency of polling to that terminal device is lowered to eliminate unnecessary polling.

7 Claims, 9 Drawing Figures

POLLING CONTROL METHOD AND SYSTEM

BACKGROUND OF THE INVENTION

1. Field of the Invention

The present invention relates to a polling system of a terminal control unit having a polling function to a plurality of terminal devices.

2. Description of the Prior Art

In order to control data transfer among a plurality of terminal devices and a central processing unit, a terminal control unit is provided between them. The terminal control unit sequentially polls the terminal devices to inquire status of the terminal devices. That is, it scans the terminal devices. Usually, the polling is effected to all terminal device addresses which the terminal control unit processes. However, as many terminal devices as can be connected to the terminal control unit are not always actually connected to the terminal control unit. Although a terminal device address is established, a terminal device may not be connected to that address. Even if it is connected, a power supply may be kept turned off. It is waste of time to poll such a terminal device address.

The polling is disclosed in U.S. Pat. Nos. 3,517,130 and 3,341,820.

SUMMARY OF THE INVENTION

It is an object of the present invention to provide a polling system which saves wasteful polling as much as possible.

In accordance with the present invention, in a terminal control unit, the number of times of continuous non-response to the polling is counted for each terminal device, and when the number of times exceeds a predetermined count, the polling to that terminal device is partially suppressed (polling is not totally suppressed but a frequency of polling is lowered) so that the polling to the terminal device whose power supply has been kept turned off for a long period or which is not actually connected to the terminal control unit is partially suppressed and a waste of time due to waiting for a response from the terminal device is saved. Thus, a polling cycle time is reduced and a polling interval to active terminal devices which are connected to the terminal control unit and whose power supplies are turned on, terminal devices which have just initialized and terminal devices whose power supplies are temporarily turned off, is shortened.

DESCRIPTION OF THE PREFERRED EMBODIMENTS

Figure 1:
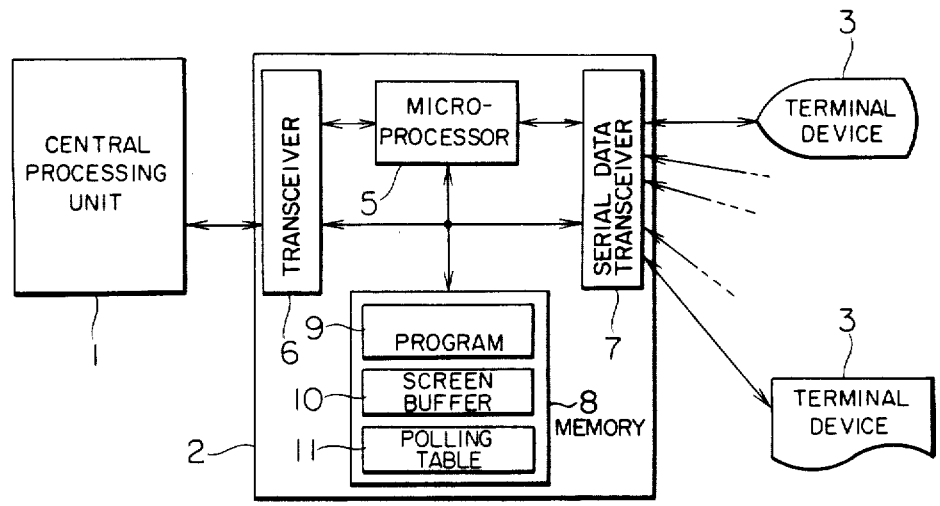
FIG. 1 shows an electronic computer system in accordance with the present invention.

FIG. 1 is a block diagram showing a configuration of a terminal control unit. The terminal control unit 2 is located between a central processing unit (CPU) 1 and a plurality of terminal devices 3 (such as display devices and/or printers) to edit data (display data, print data, etc.), control transmission and reception of data to and from the CPU 1 and control transmission and reception of data to and from terminal devices 3. The terminal control unit 2 comprises a microprocessor 5, a transceiver 6 for the CPU 1, a serial data transceiver 7 for the terminal devices 3 and a memory (RAM) 8.

The memory 8 stores therein a microprogram 9 of the microprocessor 5, an editting screen buffer 10 for the display data (or print data) and a polling table 11 for controlling the polling to the terminal devices 3 by the serial data transceiver 7. The microprogram 9 may be stored in a ROM which is independent from the memory 8.

An operation of the terminal control unit 2 is explained. The terminal control unit 2 operates in the following manner under the control of the microprogram 9. When the terminal control unit 2 receives a command (data) from the CPU 1, it stores the data in the editting screen buffer 10 in the memory 8 through the transceiver 6. The microprocessor 5 edits the data in the editting screen buffer 10 into a format which can be displayed by the display devices (or printed by the printers) and sends it to the terminal devices through the serial data transceiver 7.

The terminal control unit 2 recognizes a transmission request of the terminal device 3, a power-on status of the terminal device 3 and completion of printing by the printer, by a response to the polling and reports it to the CPU 1. If the polling is effected by the microprocessor 5 for each terminal device 1, the performance of the terminal control unit 2 is significantly lowered. Accordingly, the polling is effected by the serial data transceiver 7 independently from the microprocessor 5. This is called an auto-polling. To this end, the serial data transceiver 7 is provided with a sequence control processor. The instruction for the auto-polling from the microprocessor 5 is issued by using the polling table 11 on the memory 8, and the serial data transceiver 7 refers the information of the polling table 11 by DMA (direct memory access) to poll the terminal devices 3. When a response to the polling is returned from the terminal device, the serial data transceiver 7 interrupts the microprocessor 5.

Figure 2:
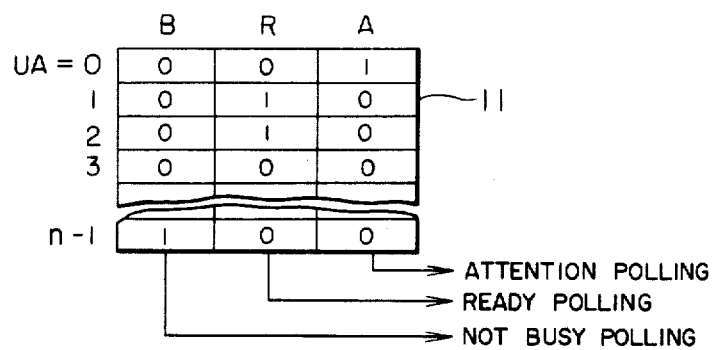
FIG. 2 shows a polling table in one embodiment of the present invention.

FIG. 2 shows an example of the polling table 11. In this example, there are three modes of polling which the microprocessor 5 instructs to the serial data transceiver 7. The polling table 11 has as many rows as the number (n) of terminal devices connectable to the terminal control unit 2 and is managed for each terminal device address (UA). The modes of polling are explained below.

In an attention polling mode, the serial data transceiver 7 polls the terminal device 3 and when an attention response is reported from the terminal device (for example, by depressing a transmission key of the terminal device 3), the microprocessor 5 is interrupted. If the terminal device reports a normal reception response to the polling, the serial data transceiver 7 polls the next terminal device.

In a ready polling mode, the serial data transceiver 7 polls the terminal device and if any response is reported by the terminal device, the serial data transceiver 7 interrupts the microprocessor 5, and if no response is reported, it polls the next terminal device. This polling mode is used to monitor the power-on of the terminal device.

In a not busy polling mode, the serial data transceiver 7 polls the terminal device, and if a response other then a busy response (indicating that the terminal device is under print operation) is reported by the terminal device, the microprocessor 5 is interrupted. This polling mode is used to monitor the completion of printing of the printer.

Figure 3:
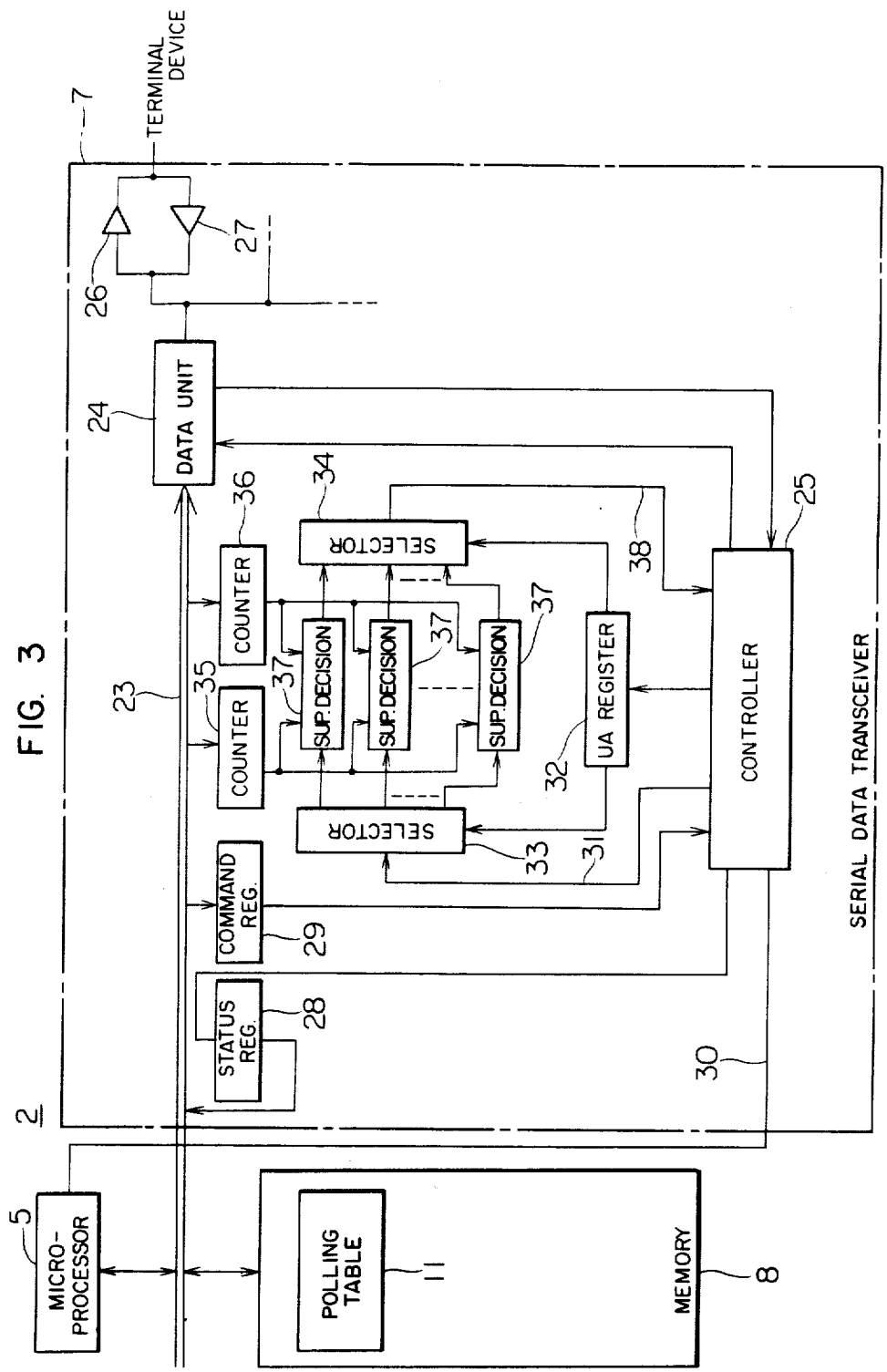
FIG. 3 shows one embodiment of the present invention.

FIG. 3 is a block diagram of one embodiment of the terminal control unit of the present invention. The like, elements to those shown in FIG. 1 are designated by the like numerals.

In the serial data transceiver 7, one terminal of a data unit 24 is coupled to an internal bus 23 in the terminal control unit 2 and the other terminal of the data unit 24 is connected to a terminal device (not shown) through a transmitter 26 and a receiver 27. In a transmission mode, the data unit 24 reads out the transmission data from the memory 8 by direct memory access (DMA), adds a flag and a cyclic redundancy check (CRC) code and a command thereto, parallel-to-serial converts it and sends it to the terminal device through the transmitter 26. In a reception mode, the data unit 24 checks the CRC code of the received data supplied from the receiver 27, serial-to-parallel converts it and writes it into the memory 8 by DMA.

Figure 4:
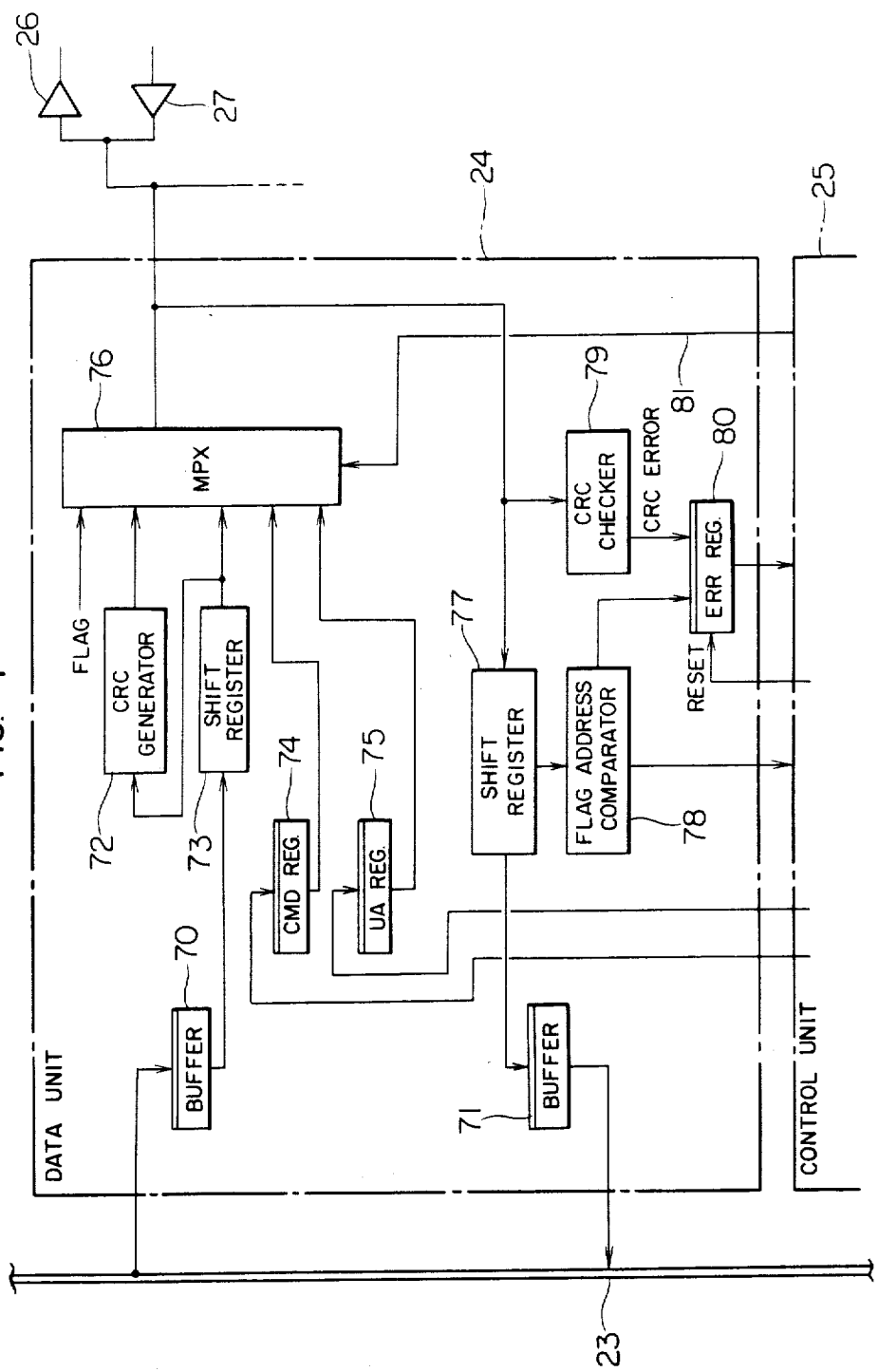
FIG. 4 shows a detail of a data unit in the embodiment of FIG. 3.

FIG. 4 shows a detailed block diagram of the data unit 24. Buffer registers 70 and 71 are connected to the internal bus 23. The former is used for transmission and the latter is used for reception. A shift register 73 is connected to the buffer register 70 and to the transmitter 26 through a multiplexor 76. A shift register 77 is connected to the buffer register 71 and the receiver 27. The shift registers 73 and 77 are used for parallel-to-serial conversion and serial-to-parallel conversion, respectively. In addition to the shift register 73, a CRC generator 72, a command register 74 and a UA register 75 are connected to the inputs of the multiplexor 76 and the data are selected by a select signal 81 from the control unit 24.

A CRC checker 79 and the shift register 77 is connected to the receiver 27, and the shift register 77 is connected to the control unit 25 through a flag address comparator 78. An error register 80 is connected to the flag address comparator 78 and the CRC checker 79 and an output thereof is supplied to the control unit 25. The command register 74 and the UA register 75 are also connected to the control unit 25.

The flag address comparator 78 is used to check the flag, identify the address of the terminal device 2 and check the response. When it identifies the address of the terminal device 2, it activates the control unit 25, and when it detects an error, it sets an error codes in the error register 80.

The data unit 24 is controlled by the control unit 25. The control unit 25 is connected to the data unit 24 through the control lines and connected to the microprocessor 5 through an interrupt signal line 30.

Figure 5:
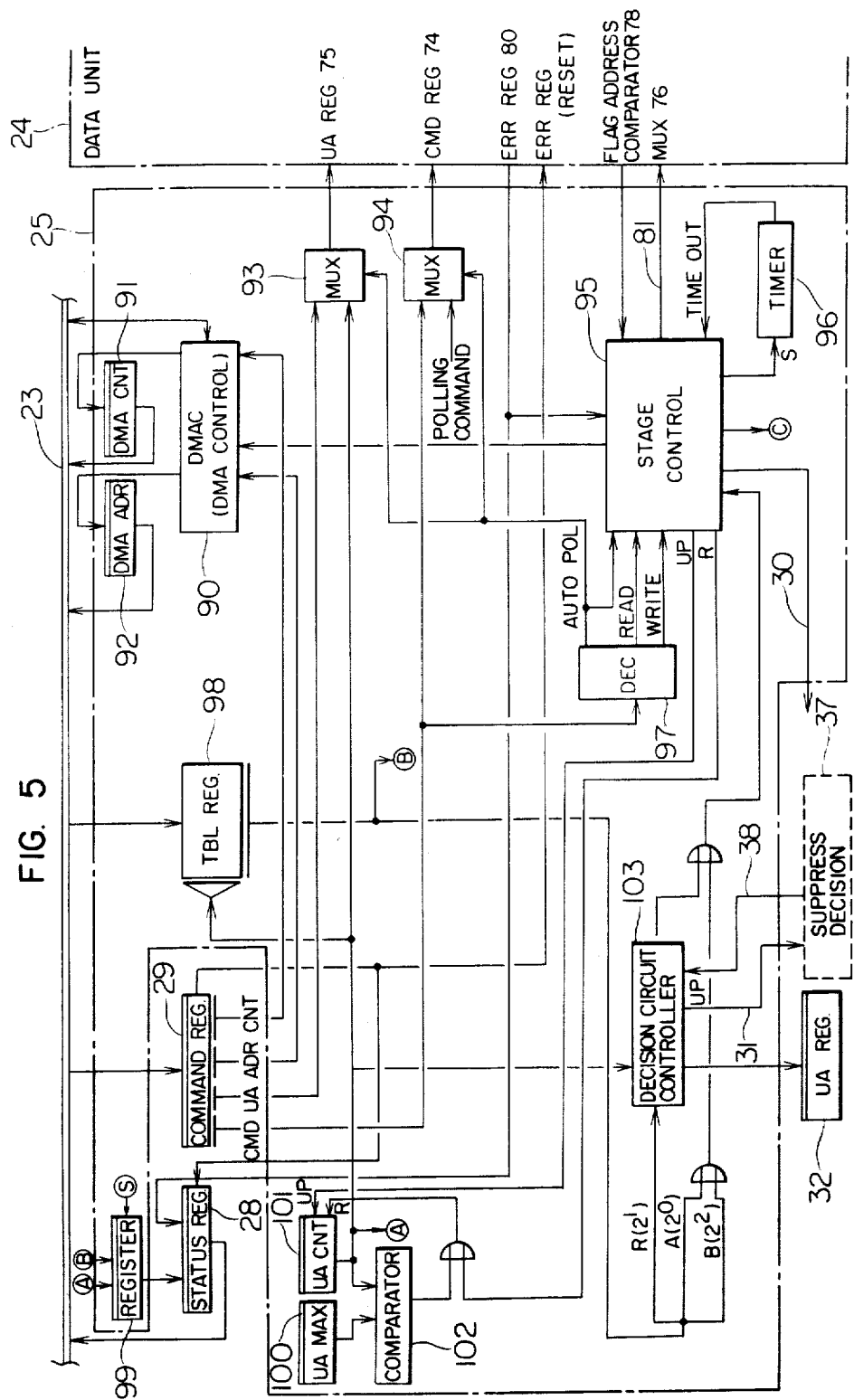
FIG. 5 shows a detail of a controller in the embodiment of FIG. 3.

FIG. 5 shows a block diagram of the control unit 25. A DMA controller (DMAC) 90 is connected to the internal bus 23 through a DMA address register 92 and a DMA count register 91. A stage controller 95 is connected to the DMAC 90, the data unit 24 and a timer 96, and to a command register 29 through a decoder 97. The stage controller 95 generates sequential control information to be described later and has a ROM which stores such control information therein. The ROM is sequentially and repeatedly read out to generate the control information. The timer 96 measures a non-response time Tw of the terminal device. A decision circuit controller 103 is connected to the transmission bus 23 through a table register 98, and to a UA register 32, a suppress decision circuit 37 and the stage controller 95. Multiplexors 93 and 94 are located between the command register 29 and the data unit 24 and other input terminal of the multiplexor 93 is connected to the UA counter 101. A comparator 102 is connected to the UA counter 101 and a maximum UA counter 100. The maximum UA counter 100 contains the maximum number of terminal devices connectable to the terminal control unit 2, less one, that is, the maximum UA. When the count of the UA counter 101 reaches the maximum UA, the comparator 102 resets the UA counter 101 to "0". An input of a register 99 is connected to the UA counter 101 and the table register 98. The register 99 is used to report a cause of interruption to the microprocessor 5 in the auto-polling mode.

The auto-polling is well known and only a portion pertinent to the present invention will be briefly explained later.

The command register 29 is located between the internal bus 28 and the control unit 25 and it is written by the microprocessor 5 and read by the control unit 25. The status register 28 is located between the internal bus 23 and the control unit 25 and it is written by the control unit 25 and read by the microprocessor 5.

A continuation counter 35 contains a reference count. In the ready polling number, if the number of times of continuous non-response reaches the reference count, the polling suppress mode (one polling in a plurality of polling cycles) is set. The continuation counter 35 is connected to the internal bus 23 and the suppress decision circuits 37 provided one for each UA. A suppress counter 36 contains a reference count. In the polling suppress mode, the polling is effected once in every plural polling cycles determined by the reference count. The suppress counter 36 is connected to the internal bus 23 and the suppress decision circuits 37. The suppress decision circuits 37 are connected to selectors 33 and 34 which are switched in accordance with the UA stored in the UA register 32. The selectors 33 and 34 are connected to the UA register 32 which contains the UA, and the UA register 32 is connected to the control unit 25. The selector 33 and the control unit 25 are connected through a count-up signal line 31, and the selector 34 and the control unit 25 are connected through a polling permit signal line 38.

An operation of the present embodiment is now described.

A normal data transmission/reception operation is first described. The transmission and reception of data to and from the terminal devices are effected by loading a command, an address on the memory 8 to or from which the data is to be written or read and the UA, in the command register 29 from the microprocessor 5. The control unit 25 activates the data unit 24 in accordance with the content of the command register 29, stores the result in the status register after the transmission or reception, and issues an interrupt signal on the interrupt signal line 30. The microprocessor 5 reads out the status register 28 and terminates the transmission/reception operation.

The above operation is explained with reference to FIGS. 4 and 5. When the terminal control unit 2 transmits a data to the terminal device, the microprocessor 5 loads an address of the transmission data, a byte count, a UA and a transmission command in the command register 29. Thus, the status register 28 and the error register 80 are reset. When the stage controller 95 recognizes that the command is a write command, through the decoder 97, it loads the address and the byte count of the command register 29 to the DMA address register 92 and the DMA count register 91, respectively, through the DMAC 90. The UA and command are loaded to the UA register 75 and the command register 74, respectively, through the multiplexors 93 and 94.

The stage controller 95 sequentially controls the multiplexor 76 by the select signal 81. It selects the data in the following order to generate a transmission frame: (1) flag, (2) UA, (3) command, (4) data, (5) CRC (6) flag. When the data (4) is transmitted, the stage controller 95 activates the DMAC and sequentially stores the transmission data in the buffer register 70. The parallel data in the buffer register 70 is converted to a serial data by the shift register 73. The outputs of the command register 74 and the UA register 75 are also serial data. The CRC generator 72 generates a CRC code for the data (4).

If a response is reported by the terminal device, the flag address comparator 78 checks if the UA in the reception frame is the address of the terminal control unit 2. If the address is to the frame of its own, the flag address comparator 78 checks the response in the reception frame, and if it is not a normal response, it loads an error code to the error register 80 and interrupts the microprocessor 5. (If it is the normal response, it merely interrupts the microprocessor 5.) The error code is loaded in the status register 28 so that it can be read by the microprocessor 5. The normal transmission operation has thus been described.

The auto-polling is next described. The auto-polling is started by the microprocessor 5 by instructing the polling mode for each UA by the table 11 and instructing the auto-polling to the command register 29. The row R of the polling table 11 contains all-"1" so that the ready polling mode is instructed to all UA's. When the control unit 25 receives the auto-polling instruction, it reads the polling table 11 by the DMA and issues the ready polling to each UA. (To this end, the control unit 25 controls the polling cycle and manages the polling UA.)

If the control unit 25 receives a response to the ready polling, it sends an interrupt request to the microprocessor 5 and activates the corresponding terminal device and shifts "1" in the row R to the row A. If the control unit 25 receives no response, it merely polls the next UA. After the polling has been cycled, the ready polling is effected to the terminal devices having "1" in the row R, and the attention polling is effected to the terminal devices having "1" in the row A. If there is a response to the attention polling, a data is transmitted or received from or by the corresponding terminal device. When the print data is sent from the CPU 1 to the terminal device, the row B of the table 11 for the terminal device is set to "1".

In this manner, the designated polling is effected to each UA in accordance with the content of the table 11.

The above operation is explained in detail with reference to FIGS. 4 and 5. When the microprocessor 5 loads the address and the count of the polling table 11 to the command register 29 and instructs the auto-polling, the address and the count are loaded to the DMA address register 92 and the DMA count register 91, respectively. The status register 28 and the register 99 are reset. The stage controller 95 resets the UA counter 101 (UA="0"), activates the DMAC 90 and writes the polling table 11 into the table register 98. In the auto-polling mode, the count in the UA counter (which is sequentially incremented starting from "0") is loaded to the UA register 75 by the multiplexor 93 in accordance with the auto-polling command, and the polling command is loaded to the command register by the multiplexor 94. At this time, the table register 98 outputs the polling table of UA="0".

When the terminal device of UA="0" responds to the polling, the flag address comparator 78 loads the content of the response to the error register 80 and activates the stage controller 95.

The ready polling is effected first. The ready polling is effected by checking if any response is reported after the transmission of the polling command to the terminal device and before the time-out of the timer 96. If there is no response before the time-out, the next UA is polled, and if there is a response, the microprocessor 5 is interrupted.

In the attention polling mode and the not busy polling mode, the terminal device responds by an attention request, a not busy response or a polling acknowledge response.

If the response is the attention request or the not busy response, the microprocessor 5 is interrupted, and if the response is the acknowledge response, the next UA is polled.

In the ready polling mode, the corresponding UA is loaded in the UA register 32 and the selectors 33 and 34 are switched so that the suppress decision circuit 37 for that UA is selected, and the count-up signal is generated on the count-up signal line 31. Only when a polling permit signal is returned through the polling permit signal line 38 to the suppress decision circuit 37 of the corresponding terminal device, that terminal device is polled. If the polling is not permitted, the polling is shifted to the next UA.

The above operation is described in detail with reference to FIG. 5. When the table register 98 indicates the ready polling, the decision circuit controller 103 loads the content of the UA counter 101 in the UA register 32 and issues the count-up signal 31. When the suppress decision circuit 37 returns the polling permit signal 38, the decision circuit controller 103 reports it to the stage controller 95. The stage controller 95 activates the multiplexor 76 and effects the polling only when the permit signal is generated. If the permit signal is not generated, the stage controller 95 increments the UA counter 101 by one.

Figure 6:
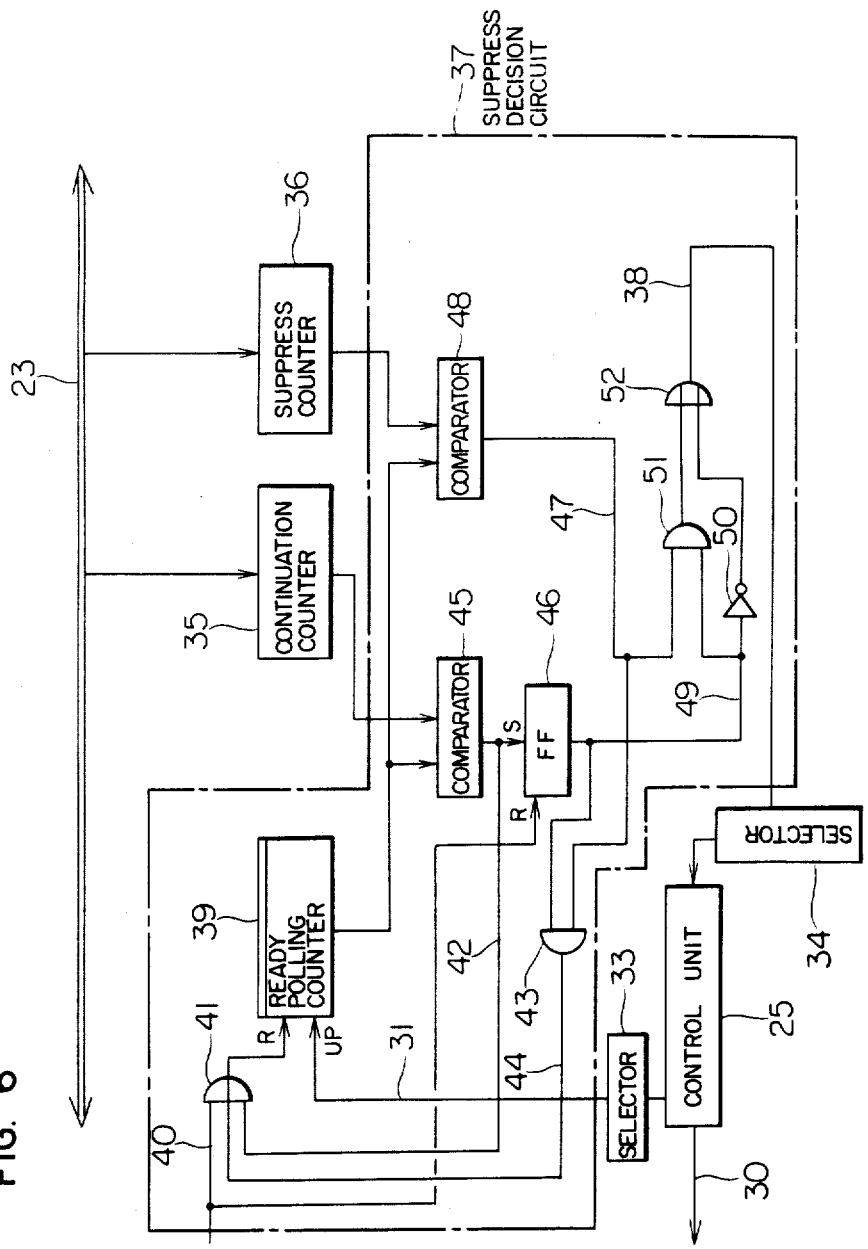
FIG. 6 shows a detail of a suppress decision circuit in the embodiment of FIG. 3.

FIG. 6 shows a circuit configuration of the suppress decision circuit 37 (for one terminal device). The ready polling counter 39 is connected to the control unit 25 through the count-up signal line 31 and connected to the comparators 45 and 48, which are connected to the continuation counter 35 and the suppress counter 36, respectively. The comparator 45 is connected to a flip-flop 46 and to the ready polling counter 39 through an OR gate 41. The comparator 48 is connected to the ready polling counter 39 through an AND gate and the OR gate 41. The comparators 45 and 48 are connected to the control unit 25 through a condition circuit comprising a NOT gate 50, an AND gate 51 and an OR gate 52. A reset signal line 40 from the microprocessor 5 is connected to the ready polling counter 39 through the OR gate 41, and also connected to the flip-flop 46.

The operation of the suppress decision circuit 37 for the ready polling is now explained.

When the terminal control unit 2 is initialized, the microprocessor 5 sets the continuation counter 35 and the suppress counter 36, and resets the ready polling counter 39 and the flip-flop 46 by a reset signal. When the count-up signal is set by the ready polling command, the count of the ready polling counter 39 is incremented by one. If the content of the ready polling counter 39 and the content of the continuation counter 35 are not equal, the flip-flop 46 is kept reset and the polling permit signal is generated so that the control unit 25 polls the corresponding UA. Each time the UA is polled, the ready polling counter 39 is incremented by one and the polling permit signal remains "1" state.

When the content of the ready polling counter 39 coincides with the content of the continuation counter 35, the comparator 45 produces a compare equal signal on the signal line 42 so that the flip-flop 46 is set and the ready polling counter 39 is reset. When the flip-flop 46 is set, the suppress decision circuit 37 assumes the polling suppress mode. This mode is set when as many count-up signals as is equal to the count in the continuation counter 35 are continuously received. In this mode, the output of the inverter is "0" and the polling permit signal is issued on the signal line 38 from the OR gate 52 only when the AND gate is open. The AND gate 51 is open when the content of the ready polling counter 39 and the content of the suppress counter 36 are equal and the comparator 48 produces the compare equal signal. At this time, the polling permit signal is issued and the ready polling is effected in that polling cycle. Since the output signal of the AND gate 43 is "1" at this time, the ready polling counter 39 is reset. In the polling cycle in which the compare equal signal 47 is not "1", the polling permit signal 38 is not "1" and the ready polling is not effected. Accordingly, the ready polling counter 39 is incremented as many times as the count in the suppress counter 36 and the polling permit signal is generated each time the ready polling counter 39 counts the count-up signal.

When the terminal device responds to the ready polling, the microprocessor 5 determines that the power supply of the terminal device is on, and resets the ready polling counter 39 in the suppress decision circuit 37 of the UA as well as the flip-flop 46 by the reset signal 40 to change the mode from the polling suppress mode to the normal mode.

In summary, in the normal mode, when the ready polling is commanded, the ready polling is effected in each polling cycle. If there is no response from the terminal device, the count in the ready polling counter 39 indicates the number of times (number of polling cycles) of continuous non-response to the ready polling. When the number of times of continuous non-response reaches the predetermined count preset in the continuation counter 35, the flip-flop 46 is set and the suppress decision circuit 37 assumes the polling suppress mode.

In the polling suppress mode, the ready polling is effected only in the polling cycle in which the content of the ready polling counter 39 and the content of the suppress counter 36 are equal, and the ready polling is suppressed in other polling cycle. Thus, the ready polling is effected once in every predetermined number of polling cycles.

Figure 7:
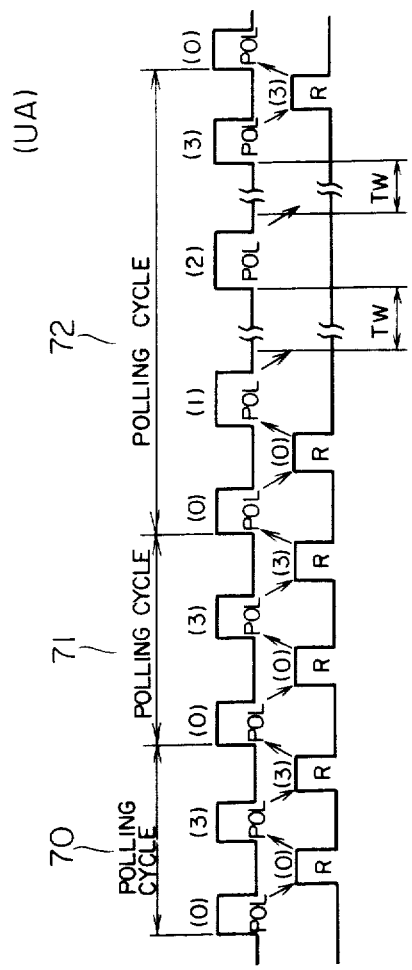
FIG. 7 shows an example of polling in the present invention.

FIG. 7 shows a simplest example of a polling sequence and a content of the polling table 11. The number of connectable terminal devices is 4, and the power supplies of the terminal devices UA=1 and UA=2 are off. (See the polling table 11.) The polling to the terminal devices UA=1 and UA=2 are suppressed in the polling cycles 70 and 71. As a result, the polling period to the terminal devices UA=0 and UA=3 whose power supplies are on is shortened and when the terminal device UA=0 or UA=3 issues a transmission request, it is reported to the terminal control unit 2 in a short time.

Figure 8:
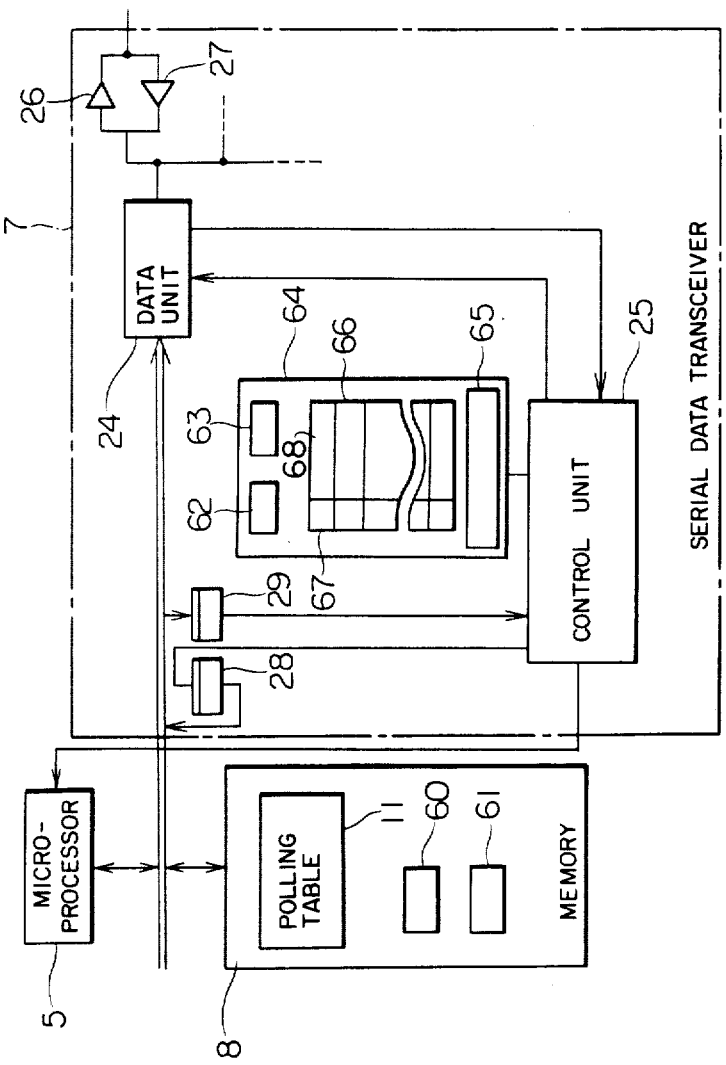
FIG. 8 shows another embodiment of the present invention.

FIG. 8 is a block diagram of another embodiment of the terminal control unit of the present invention. The like elements to those shown in FIGS. 3 and 6 are designated by the like numerals.

The present embodiment uses a processor in the control unit 25 so that the processing of the suppress decision circuit 37 is carried out under the control of a program.

A local memory 64 which stores a microprogram 65 of the control unit 25 is connected to the control unit 25. The local memory 64 also stores a continuation count 62 corresponding to the continuation counter 35 of FIG. 4, a suppress count 63 corresponding to the suppress counter 36 and a suppress table 66. The suppress table 66 contains a mode flag 67 corresponding to the flip-flop 46 and a ready polling count 68 corresponding to the ready polling counter 39, for each UA. A continuation count 60 and a suppress count 61 on the memory 8 are identical to the continuation count 62 and the suppress count 63, respectively.

Figure 9:
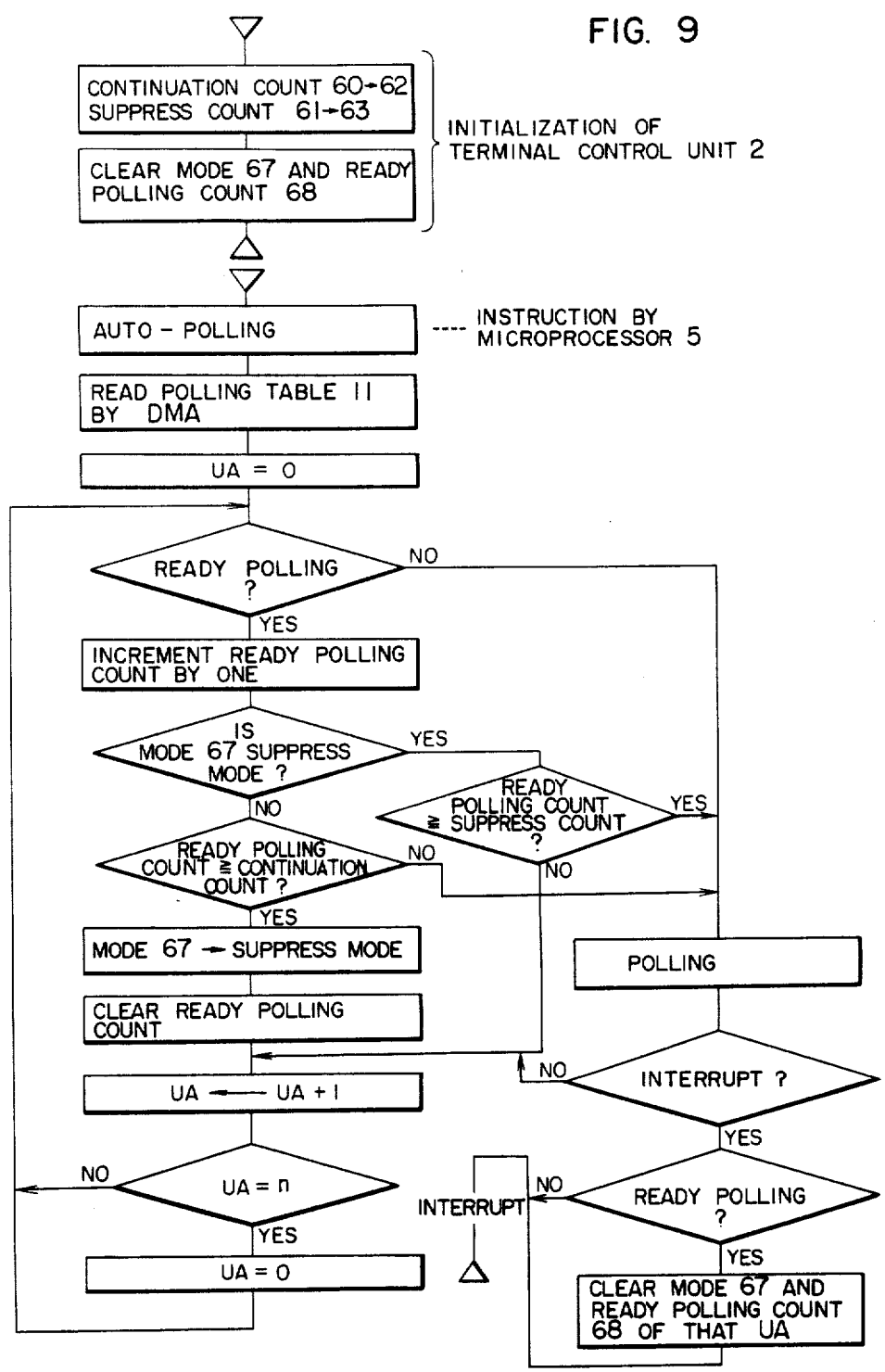
FIG. 9 shows a flow chart of a control sequence in the embodiment of FIG. 6.

The operation of the control unit 25 is same as that of the previous embodiment. A process flow thereof is shown in FIG. 9.

In FIG. 6, the comparators 45 and 48 may be arranged outside of the suppress decision circuit 37 so that they are shared by other suppress decision circuits. While the ready polling counter 39 is shared by the normal mode and the polling suppress mode, separate counters may be provided for each mode. Similarly, in FIG. 8, the ready polling count (variable) may be divided to a normal mode count and a polling suppress mode count.

The count of the suppress counter 36 and the count of the continuation counter 35 may not be variable but they may be fixed in the serial data transceiver 7.

The present invention is applicable not only to the terminal control unit but also to a unit having a similar polling function.

As described hereinabove, according to the polling system of the present invention, the polling to the terminal device whose power supply has been turned off for a long time or which is not actually connected to the terminal control unit is suppressed and the waste of time due to waiting for the response is reduced. As a result, the polling cycle time is shortened and the polling interval to the active terminal device which is connected to the terminal control unit and whose power supply is turned on, the terminal device which has just been initialized and the terminal device whose power supply is temporarily turned off is shortened.

We claim:

1. A polling method in a control unit having a plurality of terminal device address for a plurality of terminal devices comprising the steps of:
   sequentially polling to said terminal device addresses;
   counting the number of times of non-response to the polling for each of said terminal device addresses; and
   partially suppressing the polling to the terminal device address when said count for said terminal device address exceeds a predetermined number.

2. A polling method according to claim 1 wherein said step of partially suppressing repeatedly suppresses the polling by a predetermined number of times at a time.

3. A polling control system for polling a plurality of terminal device addresses for a plurality of terminal devices comprising:
   first means for generating a command for sequentially polling said terminal device addresses;
   second means responsive to said command from said first means for effecting polling; and
   third means for detecting that the number of times of non-response to the polling exceeds a predetermined number for each of said terminal device address, and lowering a frequency of polling to the terminal device address by said second means.

4. A polling control system according to claim 3 wherein said first means includes a polling table containing information for designating a polling mode for each of said terminal device addresses and means for cyclically reading said polling table to produce a command for the designated polling mode.

5. A polling control system according to claim 4 wherein said polling table contains information for non-simultaneously designating a ready polling mode for checking any response by the terminal device address and an attention polling mode for checking if the terminal device operated.

6. A polling control system according to claim 5 wherein said third means detects that the number of times of non-response to the ready polling exceeds a predetermined number, and lowers a frequency of the polling to the terminal device address by said second means.

7. A polling control system according to claim 3 wherein said third means includes a counter for each terminal device address for counting said command, means for storing first and second predetermined counts, suppress means for resetting said counter and suppressing the polling by said second means by said command when the content of said counter is equal to said first predetermined count, and means for resetting said counter and permitting the polling by said second means by said command when the count of said counter is equal to said second predetermined count after the polling was suppressed by said suppress means.

* * * * *